United States Patent [19]

Yoder

[11] Patent Number: 4,856,621

[45] Date of Patent: Aug. 15, 1989

[54] HEAVY DUTY ACTUATING MEANS IN COMBINATION WITH SURGE OR INERTIA TYPE TRAILER BRAKE SYSTEM FOR USE WITH "LOW BOY", "GOOSENECK" OR FIFTH WHEEL TRAILERS AND THE LIKE

[76] Inventor: Herbert G. Yoder, 2260 Township Rd. 190 E., Bellefontaine, Ohio 43311

[21] Appl. No.: 325,818

[22] Filed: Mar. 20, 1989

[51] Int. Cl.$^4$ .............................................. B60T 7/20
[52] U.S. Cl. ............................... 188/112 R; 188/3 H; 280/446.1
[58] Field of Search ................. 188/112, 3 R, 3 H; 303/7; 280/446.1, 447, 432, 455.1, 456.1, 460.1

[56] References Cited

U.S. PATENT DOCUMENTS

| | | |
|---|---|---|
| 3,026,975 | 3/1962 | Yoder . |
| 3,072,223 | 1/1963 | Yoder . |
| 3,141,529 | 7/1964 | Hart ..................... 188/112 |
| 3,180,454 | 4/1965 | Angelis et al. ........... 188/112 |
| 3,570,633 | 3/1971 | Garnett .................. 188/112 |
| 3,630,575 | 12/1971 | Fowler .................. 188/112 X |
| 3,647,032 | 3/1972 | Dombeck ................ 188/112 |
| 3,682,278 | 8/1972 | Wherry et al. ........... 188/112 |
| 3,768,606 | 10/1973 | Mizen et al. ............ 188/112 |
| 3,796,287 | 3/1974 | Kolm .................... 188/112 |
| 3,881,577 | 5/1975 | Wherry et al. ........... 188/112 |
| 3,892,296 | 7/1975 | DePuydt et al. .......... 188/112 |
| 3,918,744 | 11/1975 | Gay . |
| 3,948,566 | 4/1976 | Salam .................. 188/112 X |
| 4,037,856 | 7/1977 | Medlin et al. .......... 188/112 X |
| 4,082,168 | 4/1978 | Cole et al. ............ 188/112 R |
| 4,153,143 | 5/1979 | DePuydt et al. . |
| 4,249,643 | 2/1981 | Yoder .................. 188/112 R |
| 4,402,523 | 9/1983 | Knowles . |
| 4,600,089 | 7/1986 | Wilson ................. 188/112 R |
| 4,653,770 | 3/1987 | Pyle ................. 188/112 R X |

OTHER PUBLICATIONS

Yoder Brake & Mfg. Co. Drawing 75329 dated 9/29/75.

Primary Examiner—Douglas C. Butler
Attorney, Agent, or Firm—Biebel, French & Nauman

[57] ABSTRACT

Heavy duty hydraulic surge brakes for carrying high front end loads includes a fixed section for mounting on the tailer draw bar or frame and a movable section connected to the coupler. The fixed section has a frame for mounting to a trailer frame and a pair of end plates. A pair of rigid rods extend between the end plates. The hydraulic master cylinder mounts on the fixed section and has a push rod which is operated by the movable section. The movable section includes a pair of slide tubes on the rods guided by low friction bearings. A cross member joins the tubes to the draw bar, and a brake adjusting screw is carried on the tubes for coaction with the cylinder push rod. Springs urge the tubes forward on the rods, and bumpers cushion the forward position of the tubes. In another embodiment, automotive-type shock absorbers add further control of the surge-induced movement of the movable section to the fixed section.

14 Claims, 3 Drawing Sheets

HEAVY DUTY ACTUATING MEANS IN COMBINATION WITH SURGE OR INERTIA TYPE TRAILER BRAKE SYSTEM FOR USE WITH "LOW BOY", "GOOSENECK" OR FIFTH WHEEL TRAILERS AND THE LIKE

BACKGROUND OF THE INVENTION

This invention relates to surge or reaction-type brakes, and more particularly to a surge brake having an improved weight and thrust carrying slide arrangement for use with trailers and the like which have front end loads. In particular, the invention relates to a surge or reaction-type of brake assembly for heavy-duty trailers, and for high front end loads, including such trailers as the goose-neck or fifth wheel attachments, in addition to the conventional "Lo-Boy" and travel trailers.

Surge-type brakes have found limited acceptance in heavy duty applications where high front end loads must be carried, due to the friction between the relatively sliding members which form the thrust transmitting assembly. This problem is particularly acute when the front end or tongue loads approaches or exceeds 1000 pounds.

Commonly, surge-type brake hitches, or hitches which incorporate hydraulic surge brakes, employ relatively low-cost, rectangular tubular parts, one of which is proportioned to slide within another. Such sliding fits commonly require lubrication between the relatively sliding and interfitting portions, and yet, in spite of lubrication, or because of a lack of attention, the parts do not easily slide one with respect to the other, and therefore brake operation is not always dependable. These conditions, of course, become more critical with heavier front end loading.

There is accordingly a need for a surge-type brake system which includes a slide coupler assembly particularly adapted to carry heavy front end loads with a minimum of friction and attention, and to provide for reliable operation of the master hydraulic cylinder.

SUMMARY OF THE INVENTION

The coupler of this invention employs a rigid tube-supporting frame adapted to be carried on and securely fastened to the trailer front end. The support frame carries at least one longitudinally extending rod which is rigidly supported on a frame. Preferably, at least two such rods are positioned in parallel, side-by-side relation, with the ends of such rods extended through holes in the end plates and welded thereto for rigid attachment.

Sleeves, which have a length less than the length of the rods, are mounted one on each rod for sliding movement with respect to the rod. The sleeves are supported for low friction sliding movement on an associated rod by one or more load-carrying sleeve-type bearings. While relatively expensive linear roller bearings may be used, it is usually entirely satisfactory to employ a low-friction, polymer resin bearing, such as polytetrafluoroethylene (TEFLON).

The sliding tubes are, in turn, attached to or mounted on a common cross support which, in turn is connected to a draft shaft or plate connected to the hitch coupler. The improved surge brake actuator of this invention may be used with "goose neck" and fifth wheel couplers, as well as with the more conventional hitches and "Lo-Boy" arrangements.

The hydraulic brake actuating assembly including the master cylinder are carried on the tube-supporting frame. A brake actuating adjusting screw is carried for movement on the sliding tubes and position so as to actuate the input rod for the master cylinder upon relative movement of the tubes on the rods due to the reaction load of the trailer.

Preferably, a shock-absorbing bumper is positioned on the rods or located between the sleeves and the forward end plate for engagement by the tubes, to reduce noise and absorb shock. Spring means in the form of compression coiled springs are positioned between the opposite ends of the tubes and a back wall of the frame, urging the tubes in the forward position against the shock absorbing bumpers. The springs may be enclosed within a conventional elastomer bellows seal.

The tubes, which carry the coupler, are thus mounted for limited sliding movement along the associated rods, on the sleeve-type bearings. This movement is accompanied by a minimum of friction, and the tubes area being capable of carrying a relatively high front end loading, to assure reliable operation of the hydraulic surge brake.

While a box-like rod support frame is disclosed, this may be simplified by the elimination of the side supports and the provision of suitably reinforced angular gussets at the front and the rear of the assembly, for rigidly supporting one or more of the support rods and sliding sleeves thereon. In fact, such structure may be advantageous when used on fifth wheel arrangements of the goose-neck type. Further, one or more automotive-type hydraulic shock absorbers may be employed, as disclosed below, to improve the damping action of the brake. Where such shock absorbers incorporate either gas pressure or coil springs, the sleeve return springs may normally be eliminated.

It is accordingly an important object of this invention to provide an improved surge-type brake, for a hitch, adapted for carrying relatively heavy front end loads, in which at least one rigidly supported fore and aft extending rod has a sleeve mounted thereon through low friction load-carrying bearings, providing for limited controlled movement of the sleeve on the rod, to actuate a hydraulic master cylinder.

Another object of the invention is the provision of a trailer brake, as outlined above, in which side-by-side and fore and aft extending load support rods are mounted on a rigid support frame which may be a box-like frame which, in turn, is supported on the trailer frame. Sleeves are slidably mounted on the rods and carry a hydraulic adjusting screw on one side, and on the other side, are connected to the coupler for actuation by reaction loads. The front end load of the trailer is transmitted through the sleeves to the towing vehicle.

These and other objects and advantages of the invention will be apparently from the following description, the accompanying drawings, and the appended claims.

BRIEF DESCRIPTION OF ACCOMPANYING DRAWINGS

DESCRIPTION OF PREFERRED EMBODIMENTS

Figure 1:
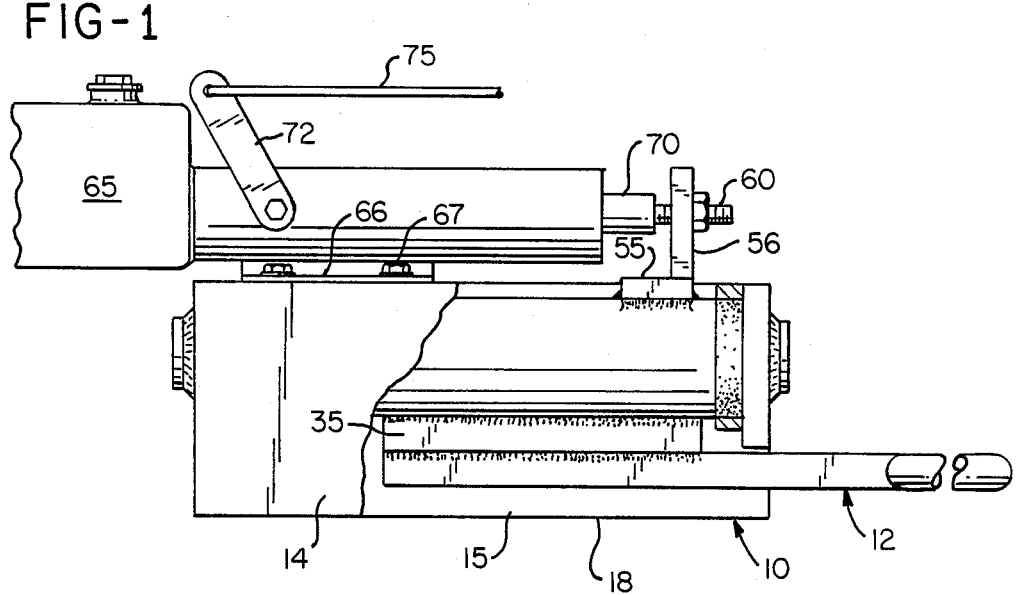
FIG. 1 is a side elevational view, partially broken away, of a heavy duty surge-type brake and coupler arrangement according to this invention.

Referring to the figures of the drawing which represents preferred embodiments of the invention, an improved surge-type brake and coupler arrangement according to this invention is illustrated as having a first or stationary section 10 which is rigidly mounted to a trailer frame (not shown), and a relatively movable section consisting of a coupler mounting assembly 12 which is slidably carried on the section 10. The coupler mounting assembly portion of the improved surge brake of this invention is suitably attached to the towing vehicle.

Figure 2:
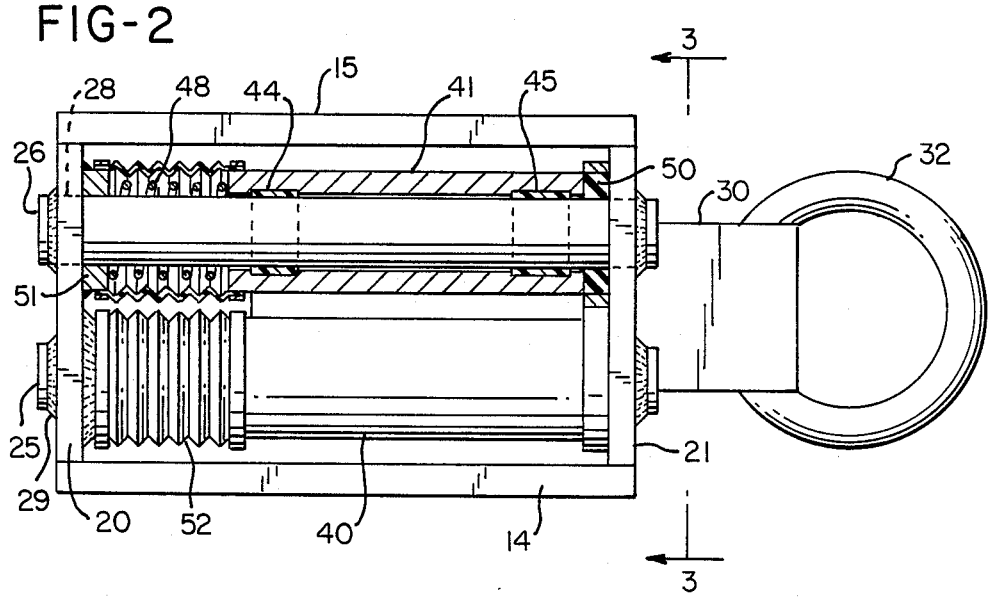
FIG. 2 is a plan view of the coupler, with the hydraulic master cylinder and cylinder support removed for clarity, and partially broken away, showing the rod support frame and the sliding tube arrangement of the load-carrying coupler portion.

The details of the fixed section 10 can best be seen by reference to FIG. 2, in which the master cylinder and cylinder mounting assembly are removed for the purpose of clarity. The section 10 includes a brake mounting frame which is adapted to be received directly on the trailer front end or on a rigid trailer support frame portion, and is made up of a box-like rigid support which includes a pair of parallel fore and aft extending side plates 14 and 15. The side plates extend down and terminate along a lower edge 18, as shown in FIG. 1, and provide a surface which may be welded or otherwise attached to the trailer frame.

The section 10 further includes a pair of identical end plates 20 and 21, extending transversely between and welded to the side plates, thereby forming a strong box-like frame. In the preferred embodiment, a pair of solid steel support rods 25 and 26 are positioned in parallel fore and aft relation with ends thereof extending through openings 28 formed in the respective end plates 20 and 21, and welded in place by welds 29. In this manner, the rigid rods 25 and 26 are positioned in side-by-side relation, extending between the end frames and within the side frames 14 and 15, within the trailer frame. It will be understood that while two rods are shown and preferred, as few as one or as many or three or more may be employed under this invention, as required to carry the intended loads.

The movable coupler section 12 includes a coupler load-carrying draft tongue or mounting assembly plate 30 as shown in FIG. 2 and a hitch coupler illustrated as a conventional ring-type coupler 32 on the forward end, although it will be understood that any kind of attachment arrangement may be used, including goose-neck and fifth-wheel couplers.

Figure 3:
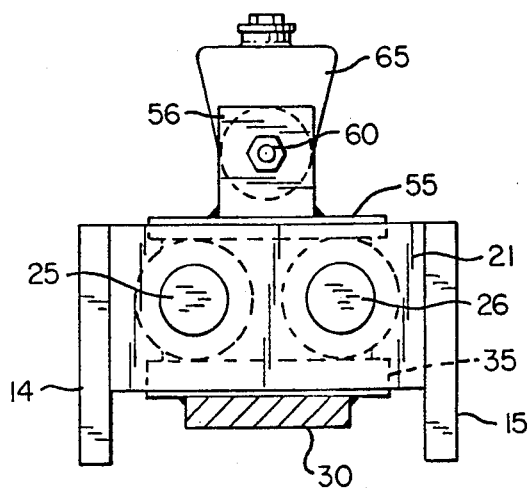
FIG. 3 is an end view, partially in section, looking generally along the line 3—3 of FIG. 2.

As perhaps best shown in the end view of FIG. 3, the attachment tongue 30 carries a welded spacer bar or support 35, within the confines of the side frame members 14 and 15, which in turn, is attached by welding, to the lower surfaces of a pair of slide sleeves or tubes 40 and 41. The spacer bar 35 extends substantially the fore and aft or axial length of the respective tubes 40 and 41, as best shown in FIG. 1, so that the loading from the coupler shank 12 is not concentrated at one or the other ends of the slide tubes, but is extended along the length of the tubes.

The slide tube 40 is telescoped over and rides on the rod 25, while the slide tube or sleeve 41 similarly is telescoped over and rides on the rod 26. The sleeves 40 and 41 each have the same axial length which is less than the length of the respective rods within the supporting frame to provide adequate actuating movement of the slide tubes on the rods.

Each of the tubes 40 and 41 carries an inside sleeve bearing 44 at one end and a second inside sleeve bearing 45 at the other end, through which the tongue loads are transmitted. The sleeve bearings, which may consist of a single elongated sleeve or a pair of bearings as shown, and are preferably formed of high density, molecular weight-bearing material, such as polytetrafuoroethylene (PTFE). The sleeve bearings form a close sliding fit with the outer surface of the associated rod, and carry the front end loads from the rods to the tubes or sleeves, and permit the tubes to slide readily on the rods without sticking, even with relatively high loadings.

Coil return springs 48 are positioned between the one end of each of the sleeves and the wall 20 to urge the sleeves in a forward direction, against an annular elastomer bumper 50. The bumper 50 absorbs shock loading and reduces sound when the respective sleeve comes into contact with a bumper. Preferably, the coil return springs are contained within a conventional bellows-type encircling boot 52, one of which is shown in elevation in FIG. 2, with the forward end of the boot attached to and carried on a sleeve, and the rear end carried on a boot ring 51. The ring is attached to the inside surface of the end plate and surrounding the rod.

It will therefore be seen, from a consideration of the assemblies and sections thus far described, that the tubes or sleeves 40 and 41 are mounted to slide in unison on the respective rods against the compression springs 48, in the space provided within the frame, upon the application of reaction loads by the trailer to the towing vehicle.

Means for coupling the movement of the sleeves 40 and 41 to operate a hydraulic cylinder include an upper transverse tie plate 55 (shown in FIGS. 1 and 3) which is welded to the upper surface of the respective sleeves, at a forward location thereof. Tie plate 55 supports an upright piece 56 which, in turn, carries therethrough a master cylinder adjusting screw 60.

A master hydraulic cylinder 65 of conventional construction is carried on a cross or support member 66 on top of the box-like frame previously described. The support member 66 is carried between the side frame plates 14 and 15 and are secured thereto to provide a firm support for the master cylinder. The master cylinder assembly is bolted to the support member 66 by bolts 67. The master cylinder is positioned with its actuating push rod 70 extending forwardly in close abutment with the end of the master cylinder adjusting screw 60, so that relative rearward movement of the upright 56, with sliding movement of the tubes, presents an actuating force to the actuating push rod 70, thus actuating the master cylinder.

The master cylinder may be provided with a conventional break away arm 72 connected to a conventional break-away cable 75 for automatic actuation of the master cylinder as the result of inadvertent separation of the coupler from the towing vehicle.

The operation of the invention is self-evident from the foregoing description. The thrust transmitting slide tubes 40 and 41 are normally retained and held in a home or riding position against the bumper 50 as urged by the springs 48, in the position shown in FIGS. 1 and 2. A surge loading causes the frame consisting of the side plates 14 and 15, and the captured end plates 20 and 21 and captured rods 25 and 26 to move forwardly, or to the right, as viewed in FIGS. 1 and 2, accompanied by relative sliding movement of the tubes 40 and 41 to the left, against the springs 48. This sliding movement is accompanied by a load transference through the low friction bearing means 44 and 45, and causes the adjusting screw 60 to drive the actuating push rod 70 of the master cylinder in an actuating stroke, to apply the brakes.

While a box-type frame comprising the side plates 14 and 15 and the end plates or end gussets 20 and 21 are disclosed above in connection with the drawings, it will be understood that this construction may be simplified by mounting the end plates on a suitable flat plate of adequate size and strength, with the end plates 20 and 21 welded thereto and supported by angular reinforcement gussets, as required. Such an arrangement would be particularly useful in applying the invention to fifth wheel arrangements of the goose-neck type, where the base plate 35 would be connected directly to the trailer front end, and the loop-type connector plate 12 would be eliminated in such a construction. Such an arrangement would enjoy the principle benefits of this invention, which include the rigid support bars 25 and 26, the sliding tubular sleeves 40 and 41 on the low friction sleeve bearings 44 and 45, so that the surge actuator moves freely upon the retarding of the movement of the towing vehicle, either by the application of brakes or by normal deceleration. This free movement ability is not presently found in surge brakes where the front end loading exceeds approximately 1,000 pounds on the towing vehicle. The construction as shown in my invention is readily capable of handling loads of 10,000 to 20,000 pounds on the towing vehicle.

Figure 4:
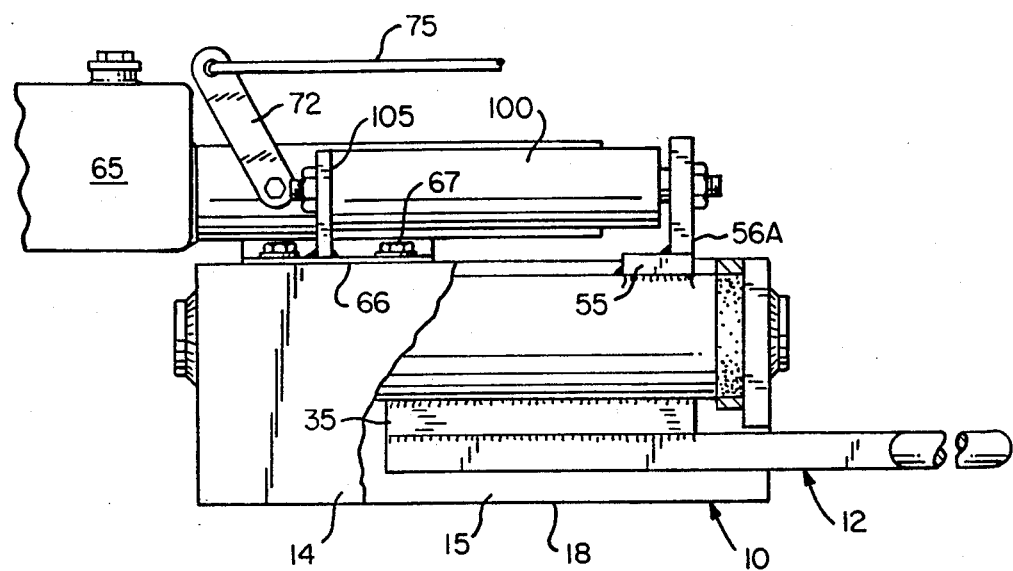
FIG. 4 is a side elevation, similar to FIG. 1, of a modified form of the invention incorporating automotive-type shock absorbers.
Figure 5:
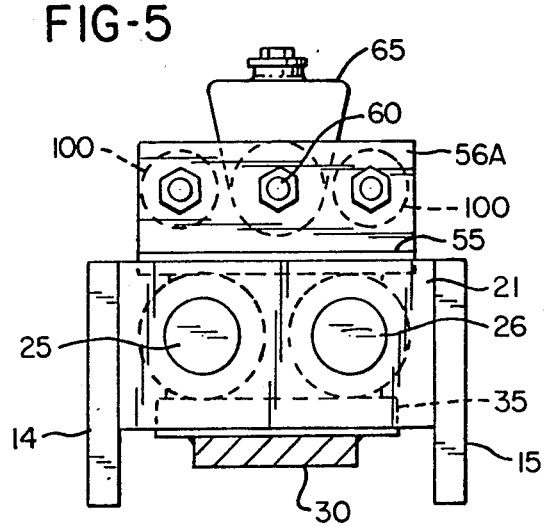
FIG. 5 is an end view, similar to FIG. 3, of the embodiment of FIG. 4.

FIGS. 4 and 5 illustrate a modified form of the invention, which incorporate hydraulic dampers in the form of automotive-type shock absorbers. As shown in these figures, a pair of shock absorbers 100 may be mounted with one along each side of the hydraulic cylinder. The shock absorbers are mounted between a modified upright plate 56a, which is extended laterally to provide a mounting for one end of the shock absorbers, and upright support plates 105 attached to the plate 66 for connecting the other end of the shock absorber. Where automotive-type shock absorbers are used for damping the movement, and where the shock absorbers internally include either gas pressure or springs, the coil return springs 48 may be eliminated.

The rugged structure is simple and easy to fabricate. While two support rods and associated tubes are shown, as few as one and as many as three or more may be employed, according to the needs of the load and the design. Conventional sway bar linkages, not shown, may be used in conjunction with this hitch assembly.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a heavy duty surge brake in which a movable section is connected to the front end of a trailer for coupling to a towing vehicle and for transmitting the front end load of the trailer to the vehicle, and a fixed section is connected to the trailer frame, and a hydraulic master cylinder is operated by relative movement between the movable and fixed sections, the improvement in coupling the movable section to the fixed section comprising:
   at least one cylindrical rod, means attaching said rod to said fixed section;
   a sleeve, means mounting said sleeve on said rod for movement with said movable section; and
   low friction sleeve bearing means between said sleeve and rod for transferring the front end load therethrough from said fixed section to said movable section.

2. The brake of claim 1 comprising a pair of said rods mounted on said fixed section in parallel relation to each other, and a pair of said sleeves one for each of said rods, and means connected said sleeves on said movable section for unison movement on said rods.

3. The brake of claim 2 further comprising bumper means between said sleeves and said fixed section for cushioning impact of said sleeves upon forward movement of said sleeves on said rods.

4. The brake of claim 1 further comprising an automotive-type shock absorber connected between said fixed and movable sections.

5. The brake of claim 1 in which a pair of said bearings are positioned between said rod and said sleeve and axially spaced on said sleeve from each other, and said bearings are formed of a low friction polymer material.

6. The brake of claim 2 further comprising a pair of longitudinally spaced apart upstanding end plates firmly mounted on said fixed section, means mounting said rods with the ends of said rods received in said end plates, and the means connecting said sleeves together comprising a transverse plate welded to each of said sleeves at outer surfaces thereof.

7. An improved surge-type brake adapted to carry relatively heavy front end loads, comprising:
   a trailer frame,
   a brake mounting frame including a pair of spaced apart parallel side plate members having extended portions adapted to be connected to said frame,
   a pair of end plates, one at each end of said side plates and extending therebetween forming a generally rectangular and rigid master cylinder support structure,
   at least one rigid rod means extending between said end plates and parallel to said side plates, and rigidly mounted to said end plates,
   a slide tube means for said rod means and having a length less than the space between said end plates and mounted over the associated said rod means,
   low friction bearing means interposed between said tube means and rod means, trailer coupler means mounted to said tube means,
   spring means between one end of said tube means and said frame urging said tube means in a forward direction,
   a hydraulic cylinder actuator carried on said tube means, and
   a hydraulic master cylinder carried on said frame having an actuator rod means engageable by said actuator with movement of said tube means rearwardly against said spring upon the surge of the trailer in a forward direction.

8. the brake of claim 7 further comprising a compression bumper on said rod means between said tube means and one of said end plates.

9. The brake of claim 7 in which said rod means comprises:

a pair of rigid rods extending between said end plates in parallel side-by-side relation, and said tube means comprises a corresponding pair of tubes, one each mounted on one of said rods.

10. A surge brake for trailers capable of operating under relatively heavy weights, comprising:

a rigid support adapted to be mounted to a trailer frame, a pair of rigid rods extending in parallel side-by-side relation on said support, a pair of tubes one each mounted on one of said rods, bearing means between each said rods and the associated said tube providing for free sliding movement therebetween, said tubes having a length less than that of said rods providing for limited free sliding movement of said tubes on said rods through said bearing means, impact bumper means between said tubes and said support at the forward end and spring means between said support and said tubes at the other end thereof, a coupler, means connecting said coupler to said tubes, a hydraulic master cylinder having a push rod, means mounting said master cylinder to the aft end of said support with its push rod extending forwardly toward said coupler, and a hydraulic cylinder adjusting screw, means mounting said screw on said tubes for coaction with said push rod upon said sliding movement of said tubes from a forward position at said bumper means to a rearward position against said spring means.

11. A heavy duty surge brake for trailers capable of operating under relatively heavy weights, comprising:

a rigid support including a pair of parallel fore and aft side frames adapted to be mounted to a trailer frame closed by a pair of end frames, a plurality of rods extending in parallel side-by-side relation between said end frames and within said side frames, and rigidly mounted to said end frames, a corresponding plurality of tubes one each mounted on one of said rods, bearing means between each said rods and the associated said tube providing for free sliding movement therebetween, said tubes having a length less than that of said rods between said end frames providing for limited sliding movement of said tubes on said rods through said bearing means, spring means between said support and said tubes at the end thereof, a coupler, means connecting said coupler to said tubes, a hydraulic master cylinder having a push rod, means mounting said master cylinder to an aft end of said support with its push rod extending forwardly toward said coupler, a hydraulic cylinder adjusting screw, means mounting said screw on said tubes for coaction with said push rod upon said sliding movement of said tubes from a forward position to a rearward position against said spring means.

12. A heavy duty surge brake adapted to carry relatively heavy loads, comprising:

a trailer frame, brake mounting means on said trailer frame a pair of spaced end plates, a pair of rods extending between said end plates and rigidly mounted thereto, a pair of slide tubes, one for each said rods and having a length less than the space between said end plates and mounted over the associated said rod, low friction bearing means interposed between said tubes and rods, coupler means mounted to said tubes, and a hydraulic cylinder actuator on said frame having an actuator rod means engageable by movement of said tubes upon the surge of the trailer in a forward direction.

13. The surge brake of claim 12 in which said low friction bearing means comprises a pair of high density low friction polymer sleeves positioned in each of said sleeves and axially spaced to guide said sleeves on said rods without binding.

14. The surge brake of claim 12 further comprising a pair of automotive-type shock absorbers, and means mounting said shock absorbers between said frame and said sleeves for damping the movement of said sleeves on said rods during surges.

* * * * *